(12) United States Patent
Bernardo et al.

(10) Patent No.: US 9,004,571 B1
(45) Date of Patent: Apr. 14, 2015

(54) HARD FOLDING TONNEAU COVER

(71) Applicants: Richard Gregory Bernardo, Pompano Beach, FL (US); Brandon G. Bernardo, Pompano Beach, FL (US)

(72) Inventors: Richard Gregory Bernardo, Pompano Beach, FL (US); Brandon G. Bernardo, Pompano Beach, FL (US)

( * ) Notice: Subject to any disclaimer, the term of this patent is extended or adjusted under 35 U.S.C. 154(b) by 0 days.

(21) Appl. No.: 13/964,545

(22) Filed: Aug. 12, 2013

Related U.S. Application Data

(60) Provisional application No. 61/681,842, filed on Aug. 10, 2012, provisional application No. 61/714,261, filed on Oct. 16, 2012.

(51) Int. Cl.
*B60J 7/14* (2006.01)

(52) U.S. Cl.
CPC ........................................ *B60J 7/141* (2013.01)

(58) Field of Classification Search
USPC .............. 296/100.03, 100.04, 100.09, 100.17
See application file for complete search history.

(56) References Cited

U.S. PATENT DOCUMENTS

| | | | | |
|---|---|---|---|---|
| 3,416,835 A * | 12/1968 | Ohle | ......................... | 296/100.09 |
| 3,649,072 A * | 3/1972 | Cross | ....................... | 296/100.03 |
| 4,210,361 A * | 7/1980 | Marvin et al. | ................. | 296/210 |
| 4,547,014 A * | 10/1985 | Wicker | ..................... | 296/100.12 |
| 4,550,945 A * | 11/1985 | Englehardt | ............... | 296/100.09 |
| 4,747,441 A * | 5/1988 | Apolzer et al. | ................ | 160/206 |
| 4,867,220 A * | 9/1989 | Matsumoto et al. | ............ | 160/35 |
| 6,000,744 A * | 12/1999 | Kooiker | .................... | 296/100.09 |
| 6,170,900 B1 * | 1/2001 | Kooiker | .................... | 296/107.09 |
| 6,321,819 B1 * | 11/2001 | Copp et al. | ...................... | 160/35 |
| 6,767,043 B1 * | 7/2004 | Sanseviero | ............... | 296/100.03 |
| 7,261,362 B1 * | 8/2007 | Mendez | ..................... | 296/100.12 |
| 7,404,586 B2 * | 7/2008 | Seiberling | ................ | 296/100.09 |
| 2004/0164584 A1 * | 8/2004 | Wheatley | ................. | 296/100.04 |
| 2010/0133872 A1 * | 6/2010 | Kosinski | .................. | 296/100.09 |

\* cited by examiner

*Primary Examiner* — Jason S Morrow
(74) *Attorney, Agent, or Firm* — Malin Haley DiMaggio & Bowen, P.A.

(57) ABSTRACT

A hard folding cover system for securely covering the bed of a pickup truck that can be opened or closed without the need to manually lift and fold individual panels sequentially in order to access the bed of the truck. The cover includes a plurality of hard folding panels that pivotably interconnected by alternatingly attached up-acting hinges and down-acting hinges whereby the panels are configured to sequentially fold and retract lengthwise while riding along side tracks. The cover is configured to operate between a flat position and at least one retracted position; in the retracted position, at least one of the folding panels is in a substantially vertical position. As the cover is retracted, the panels sequentially fold vertically toward one another. The retracted position, the panels do not block a rear window or brake light of the vehicle on which the cover is installed.

11 Claims, 8 Drawing Sheets

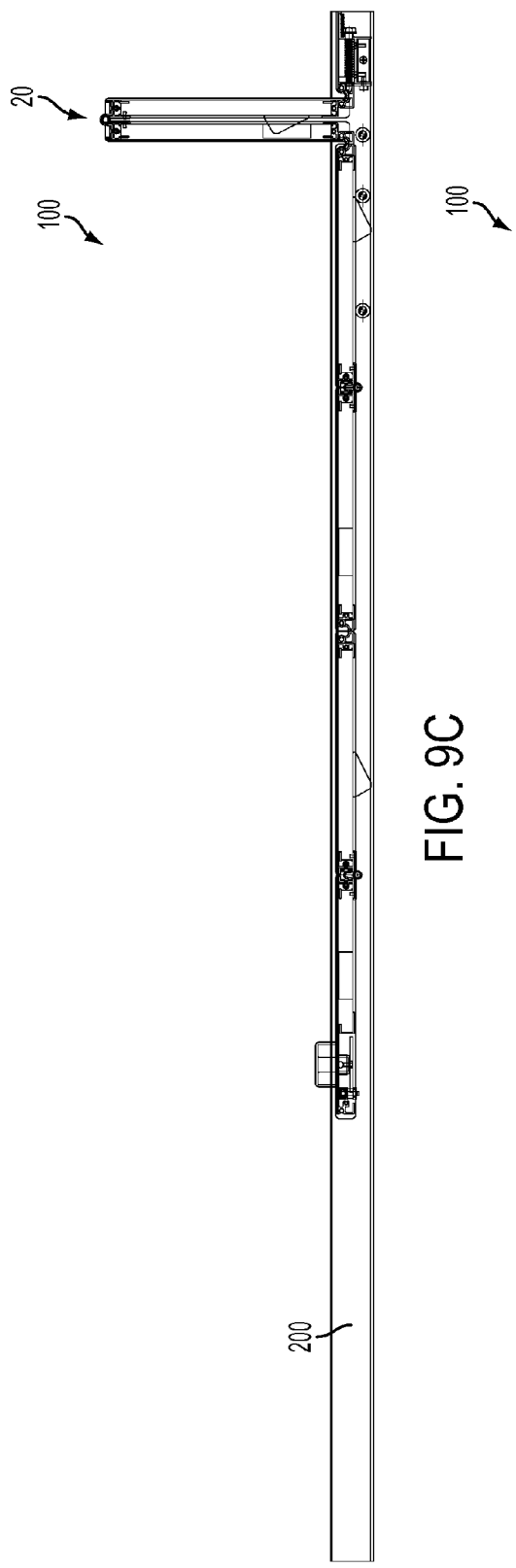
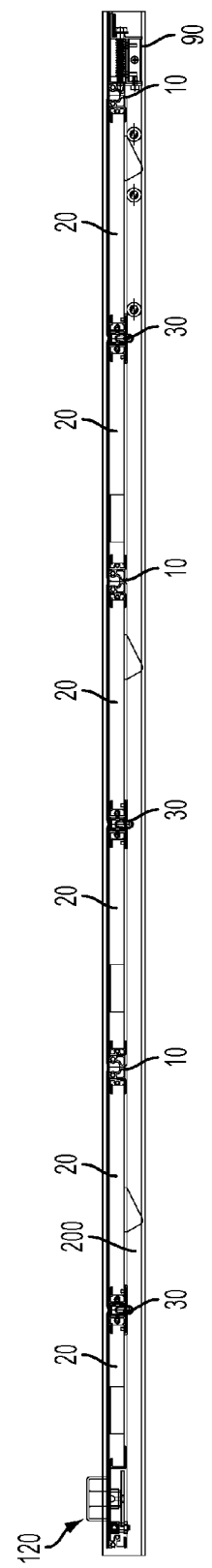
FIG. 9C
FIG. 9D

HARD FOLDING TONNEAU COVER

CROSS REFERENCE TO RELATED APPLICATIONS

This application claims the benefit of U.S. Provisional Application No. 61/681,842 filed on Aug. 10, 2012 and U.S. Provisional No. 61/714,261 filed Oct. 16, 2012.

BACKGROUND OF THE INVENTION

1. Field of the Invention

The present invention relates generally to vehicle accessories and more specifically to various embodiments of a folding hard tonneau cover for pickup trucks.

2. Description of Related Art

Tonneau covers are a popular accessory for pickup trucks because they provide security and protection for the contents of an otherwise exposed truck bed. There are several types of tonneau covers including hard folding tonneau covers, soft tonneau covers, hard retractable tonneau covers, and fibreglass lid or cap-style tonneau covers. Hard folding tonneau covers are designed to provide security and weather protection for the contents of a truck bed at a reasonable price. They are substantially more secure than products of the lower priced category of soft tonneau covers, and strategically priced below the more versatile and expensive categories known as hard retractable tonneau covers and fibreglass lids and caps.

A common characteristic of hard folding tonneau cover systems is that they all comprise a series of flat rigid panels positioned in parallel and contiguous relationship and extending across the width of a truck bed from bed-rail to bed-rail. These panels are connectively joined to one another by hinging means of various designs creating a continuous and movable protective covering over the truck bed. In order for a user to open a typical hard folding tonneau cover and gain access to the truck bed, the user must manually activate the cover system's release mechanism. Currently, most of these devices first require the user to lower the truck bed tailgate in order to gain access to the release mechanism. This process can be quite difficult and inconvenient if the operator happens to have one hand occupied with a cargo item or items intended for placement within the truck bed.

Another common characteristic of existing hard folding tonneau systems is the way they are manipulated. After the operator lowers the tailgate and activates the release mechanism at the rearward-most edge of the rearward-most panel, the operator lifts the panel by its back edge while the panel's forward edge rotates at the hinge point which connects the panel to the adjacent forward panel. The lifted panel is then folded over and onto the adjacent forward panel. With the rearward-most panel now folded onto the adjacent forward panel, the adjacent forward panel can then also be released by a similar mechanism at its rearward-most edge and both panels can be lifted and rotated together. Some of these cover designs fold one panel on top of the other as previously described, and then the stack of folded panels can then be folded up and secured in a vertical position immediately behind the cab of the truck. This vertical panel storage position provides almost full access to the bed of the truck, and is very useful when necessary to accommodate, for example, a large object which would otherwise extend upward beyond the plane of the cover thereby conflicting with the cover if it were to be extended across the truck bed. However, when the panels are folded up and stored in a vertical position behind the cab of the truck, the rear window of the cab is completely obstructed and use of the center mounted rear view mirror is virtually eliminated. The third brake light (brake light mounted above the back window of the cab) is also obstructed in some cases, which could be considered a compromise of safety and/or may in fact be a violation of traffic laws/ordinances. Thus, a more elegant solution is needed.

Some of these cover designs such as the Fold-A-Cover device and a variation of a Solid-Fold device called Encore, also include a means to release the forward-most panels. These designs permit access to the front portion of the truck bed (nearest the cab) without having to release and fold up all of the rearward panels. However these designs do not permit the entire cover to be folded up and stored in the vertical position adjacent to the cab and therefore do not provide complete access to the truck bed unless the cover is completely removed, which can be very inconvenient or impractical depending upon the circumstances.

While some of the products described above can only be opened from the tailgate, and others allow access from the front, and some permit vertical storage behind the cab, all of these hard folding tonneau cover systems have one thing in common: they require the operator to lift and fold a series of panels in order to gain access to the truck bed. Accordingly, this requires the operator to be of sufficient height and strength to perform these tasks in order to effectively use any of these hard folding cover systems.

Further, it is important to note that to safely drive with the cover in a partially or fully opened position, all of the above described covers require a secondary means of securing or latching the open panels on both sides of the vehicle to prevent them from flopping in the wind, falling down, or breaking. These secondary latching or securing means add undesirable complications to the cover system.

Accordingly, there is a need in the art for an improved folding hard tonneau cover that solves the problems outlined above. To that end, by comparison to the above described products, the present invention was designed to greatly simplify the operational use of a hard folding tonneau cover making the cover a more user friendly application, and to provide truck owners with expanded features and benefits.

It is, therefore, to the effective resolution of the aforementioned problems and shortcomings of the prior art that the present invention is directed. However, in view of the hard folding tonneau covers in existence at the time of the present invention, it was not obvious to those persons of ordinary skill in the pertinent art as to how the identified needs could be fulfilled in an advantageous manner.

SUMMARY OF THE INVENTION

The present invention comprises various embodiments of a novel folding hard tonneau-like cover for a vehicle such as a pickup truck. In some embodiments, the cover comprises a plurality of hard folding panels that are pivotably connected to one another by alternatingly attached up-acting hinges and down-acting hinges wherein the plurality of panels are configured to sequentially fold and retract lengthwise. The cover is configured to operate between a flat position and at least one retracted position; in the retracted position, at least one of the folding panels is in a substantially vertical position. As the cover is retracted, the panels sequentially fold vertically toward one another. In the retracted position, the panels do not completely block a rear window or brake light of the vehicle on which the cover is installed. The front of the cover is connected to a compressible spring-loaded bulkhead flange that provides the initial forward movement of the assembly thereby initiating the upward movement and folding action of the forward most pair of panels when a pushing force is applied to the rearward most panel.

To improve the appearance of the cover, the top surface of said panels is covered uniformly with a surface material like vinyl, such that the up-acting hinges and down-acting hinges are not visible when the cover is in said flat position. The surface material also seals the hinges and component parts of the cover from moisture and dirt.

The cover is adapted to travel along at least a pair of side tracks and is selectively lockable with respect to the side track at any location thereof. The cover is retained and travels along the tracks such that it is selectively lockable in a plurality of retracted positions, wherein in the retracted position at least one of the panels is in a substantially vertical position.

Accordingly, it is an object of the present invention to provide a hard folding tonneau cover system for securely covering the bed of a pickup truck that can be opened or closed without the need to manually lift and fold individual panels sequentially in order to access the bed of the truck.

It is another object of the present invention to provide a hard folding tonneau cover system comprising a plurality of hard folding panels whose movement is retractable, enabling secured storage at the front of the truck bed and eliminating the need to latch down open panels to prevent them from undesirable movement caused by wind when the vehicle is in motion.

It is yet another object of the present invention to provide a hard folding tonneau cover system comprising a plurality of panels whose vertical dimension when stored does not prohibit use of the vehicle's rear view mirror and third tail-light.

It is yet another object of the present invention to provide a hard folding tonneau cover system with a uniformly applied laminated surface treatment, providing a greatly improved appearance with no visible panel frames.

It is yet another object of the present invention to provide a hard folding tonneau cover system constructed of individual hard panels to move freely along the length of the bed of a truck on cylindrical roller bearings when pushed toward the cab of the truck, and to have the panels sequentially fold into a vertically stored position behind the cab of the truck one pair of panels at a time.

It is yet another object of the present invention to provide a hard folding tonneau cover system that provides a means to automatically secure the folded panels either incrementally, one pair at a time, or all pairs of panels together and to permit safe operation of the vehicle with some or all of the panel pairs in this open (vertically stored) position.

In accordance with these and other objects which will become apparent hereinafter, the instant invention will now be described with particular reference to the accompanying drawings.

DESCRIPTION OF THE DRAWINGS

FIGS. 9A-9D are side elevational views of the cover of the present invention in various states of retraction and folding.

DETAILED DESCRIPTION

The following detailed description begins with a description of several embodiments of the structural components employed, which description is followed by an explanation of the features and benefits of the present invention in light of the structural description. Generally, the present invention is a folding hard tonneau cover for a vehicle comprising a plurality of hard folding panels pivotably connected to one another by alternatingly attached up-acting hinges and down-acting hinges wherein the panels are configured to sequentially fold and retract lengthwise.

Figure 1:
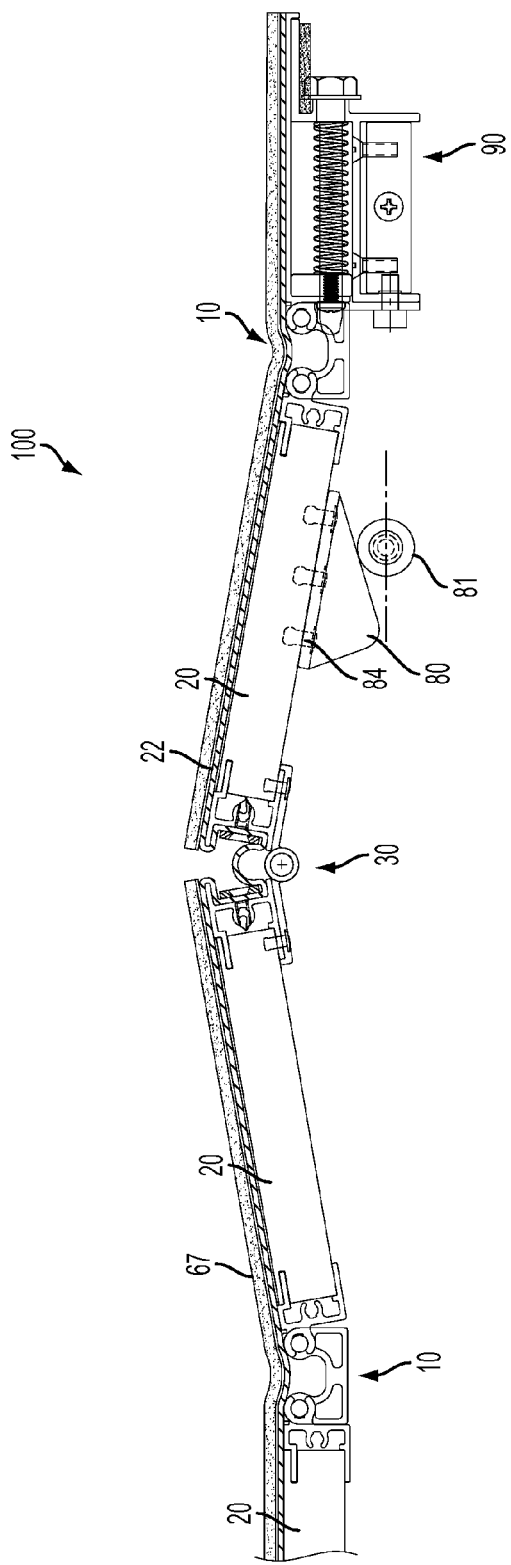
FIG. 1 is side elevational view of one embodiment of the cover of the present invention in an assembled and functional position.

With reference to all of the drawings but specifically to FIG. 1, to facilitate the "accordion" style retractable movement of the cover 100 includes two uniquely designed hinges, an up-acting hinge 10 to permit contiguous panels 20 to rotate in an upward direction, and a down-acting hinge 30 to permit contiguous panels 20 to rotate in a downward direction, hence providing the alternating action of both upward and downward interconnected panels 20 in an accordion-style retractable movement. The cover 100 terminates at the rear of a truck cab and is supported by a compressible bulkhead flange assembly 90. The Bulkhead flange assembly 90 engages an up-acting hinge 10 as shown. A runner gasket 67 is disposed along the top edge of the panels 20 as further described herein. Accordingly, in some embodiments of the present invention, the cover 100 will employ one or more of both the up-acting hinge 10 and the down-acting hinge 30 in order to provide the accordion-style folding and retracting action that makes the present invention so unique.

Specific Elements of Up-Acting Hinge Design

Figure 2:
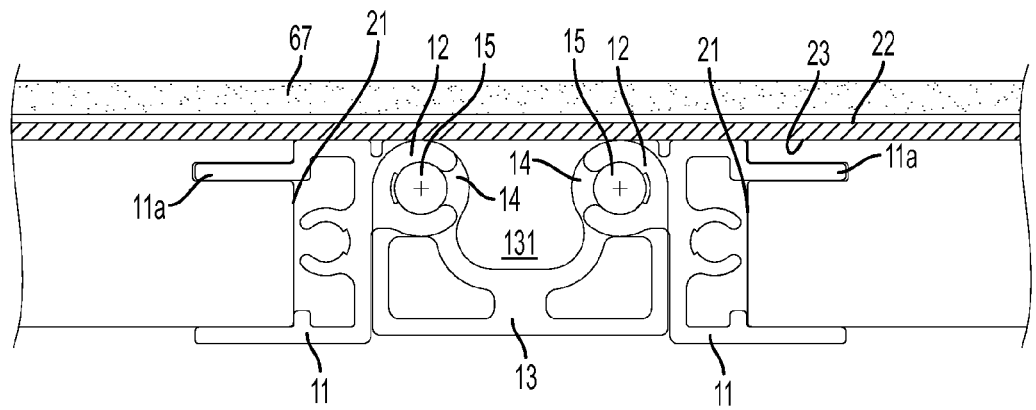
FIG. 2 is a schematic side elevational view of one embodiment of an up-acting hinge used in the present invention.

The following is a description of the cover 100 up-acting hinge 10 and the characteristics of its design that permits the application of a vinyl surface material 22 to mechanically joined and concentrically rotating contiguous panels 20:

FIG. 2 is a cross-sectional view of the cover 100 up-acting hinge 10 showing the relationship of contiguous cover panels 20 in the flat position. In some embodiments, the cover panels 20 comprise a sturdy composite material. A vinyl surface material 22 is attached over the top of the panels 20 and hinge 10 and, in some embodiments, is attached thereto by a structural adhesive 23. Runner gasket 67 is disposed along the top edge of the panels 20 above the surface material 22 as further described herein. Attached to the ends 21 of the cover panels 20 are extruded aluminium up-acting panel frames 11. In some embodiments, the panel frames 11 are attached to their respective panels 20 by flanges 11a which are received into the panels 20. Extending from each of the panel frames 11 are hinge barrels 12. The integral hinge barrel 12 of each panel frame 11 is kerfed or notched at intervals along its length (typically 4 places) in exact alignment with kerfs in the opposing panel frame. These kerfs permit the hinge barrels 12 to attach to and engage the double barrel panel joiner 13 such that the hinge barrels 12 of the adjacent panel frames 11 are disposed on either side of the panel joiner 13. The panel joiner 13 includes bi-lateral barrels 14 which provide the connection point to the hinge barrels 12 of the two opposing panel frames 11. A hinge pin 15 is then provided through each hinge barrel 12—barrel 14 engagement thereby connecting the panels 20 together to create a pivotably joined assembly with the centers of the hinge barrels 12 strategically set apart and aligned. A gap 131 is provided between the hinge barrels 12 to allow for the hinging action further described below.

Figure 3:
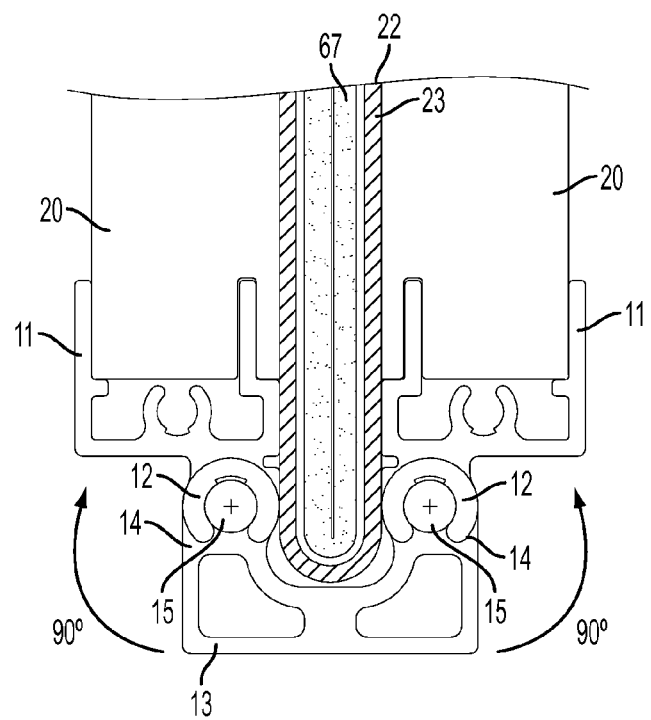
FIG. 3 is another schematic side elevational view of one embodiment of an up-acting hinge used in the present invention.

Referring now to FIG. 3, the up-acting hinge 10 is shown in an upward position with its strategically set apart hinge barrels 12 and the panels 20 in the fully rotated (vertically stored) position. The purpose of the spacing between the hinge barrels 12, in effect caused by the spacing of the barrels 14 of the panel joiner 13, is to set the contiguous panels 20 apart in order to provide a space for the vinyl surface material 22 to pay into as the panels rotate. Without this space, shown as gap 131 in FIG. 2, rotation of the panels would not be possible, as to permit rotation the vinyl surface material of each panel must be allowed to travel a distance equal to one quarter of the circumference of the hinge barrel 12 around which the panel rotates, hence the strategic significance of the space between hinge barrels. Forcible rotation of the panels without the appropriate space would cause irreparable damage to the vinyl surface material. Not only is the horizontal dimension of this space or gap 131 significant, the vertical dimension is equally important because the vinyl material from the contiguous panels pays downward as the panels rotate upward and ultimately the vinyl must be allowed to freely form a loop or half circle extending from one panel to the other as shown if FIG. 3.

The object of this up-acting hinge design is to provide a means to structurally and mechanically join contiguous panels 20 so as to be upwardly rotatable to 90 degrees as shown in FIG. 3 and yet permit the application of a vinyl surface material 22 to the top surface of the panels 20 to function as both water barrier and aesthetic enhancement.

Specifics Elements of Down-Acting Hinge Design

Figure 4:
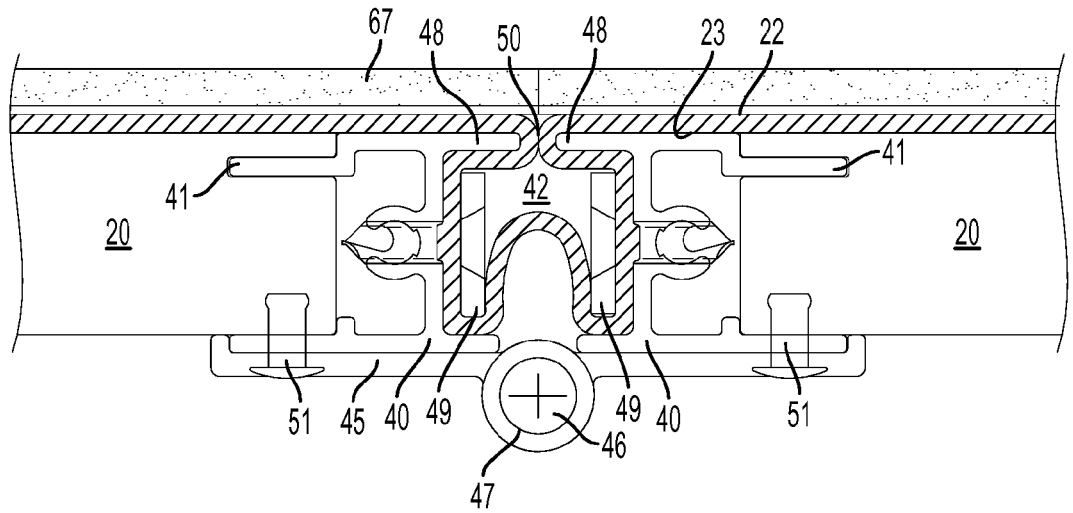
FIG. 4 is a schematic side elevational view of one embodiment of a down-acting hinge used in the present invention.

FIG. 4 is a cross-sectional view of the cover 100 down-acting hinge 30 showing the relationship of the contiguous cover panels 20 in the flat position. A vinyl surface material 22 is attached over the top of the panels 20 and hinge 30 and, in some embodiments, is attached thereto by a structural adhesive 23. The panel ends 21 are attached to extruded aluminium panel frames 40. In some embodiments, the panel frames 40 are attached to their respective panels 20 by flanges 41 which are received into the panels 20. Also incorporated within the panel frame's 40 cross-section is a recess 42 that receives the vinyl surface material 22. The surface material 22 spans the recess 42 of two adjacent panel frames 40 and provides a continuous seal and coverage for the hinge 30. The down-acting panel frames 40 are mechanically joined by a single barrel panel joiner 45 and a hinge pin 46 which are positioned on center and beneath the contiguous cover panels 20. Accordingly, the single barrel panel joiner 45 includes a hinge barrel 47 which provides the pivot point for the down-acting hinge 30. In some embodiments, the single barrel panel joiner 45 is fastened to the respective cover panels 20 by one or more rivets 51 disposed therethrough.

Figure 5:
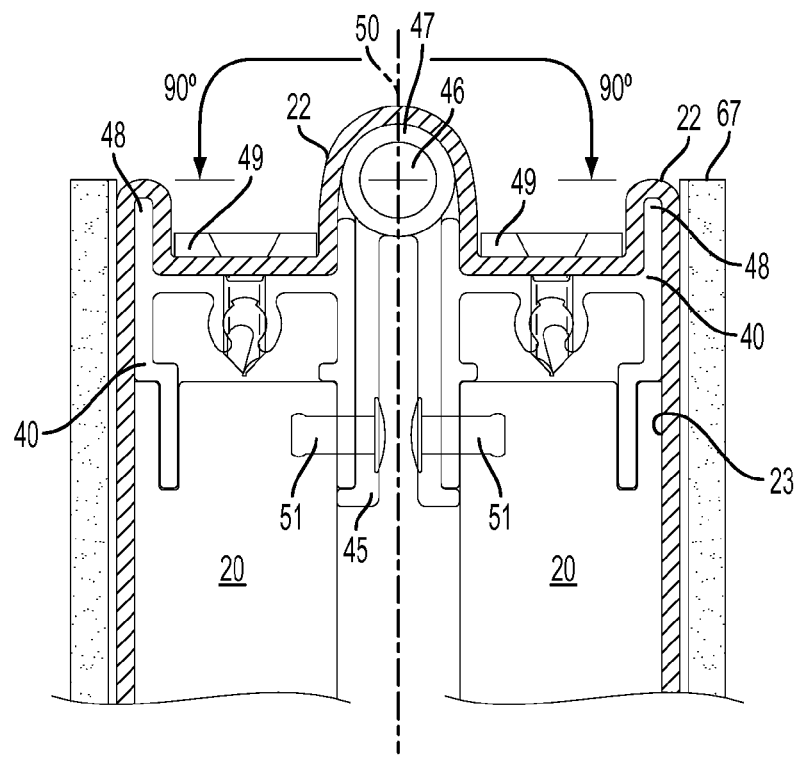
FIG. 5 is another schematic side elevational view of one embodiment of a down-acting hinge used in the present invention.

Unlike the up-acting hinge 10, where the vinyl surface material 22 passes in a straight line over the hinge assembly 10 from panel to panel when the panels are in the flat position, the vinyl on the down-acting hinge 30 is wrapped over the panel frame edge flanges 48 and secured to the abutting ends of the panel end frames 40 forming a loop of slack vinyl which folds into the pocketed relief 42 between the adjoining panel frames 40 when the panels are in the flat position. FIG. 5 shows the panels of the down-acting hinge 30 in the fully rotated and parallel position. Here the vinyl surface material 22, which previously formed a loop folded into the pocketed relief 42 between the panel end frames 40, is now drawn down and around the hinge barrel 47 as a result of the concentric rotational movement of the panels around the hinge pin 46 center. Without this loop of excess vinyl 22, rotation of the panels 20 would not be possible. To ensure that no water passes through the seam created by the vinyl wrapped edges of the contiguous panel frames, the surface material 22 is looped into recesses 42 of the respective panel frames 40. Clamps 49 secure the surface material 22 to the respective panel frames 40 inside recess 42, providing a tight fitment.

FIG. 5 shows the panels of the down-acting hinge in the fully rotated position. Here the flexibility of the surface material 22 within recess 42 is demonstrated as the surface material 22 is shown splayed open and covering the connecting hinge 30 between the panels. The object of this hinge design is to provide a waterproof means to structurally and mechanically join contiguous panels so as to be downwardly rotatable to 90 degrees, and yet permit the application of a continuous, uninterrupted surface material to function as both water barrier and aesthetic enhancement.

As shown and described, the down-acting hinge 30 mechanically joins two contiguous panels 20 allowing them to fold downwardly. It employs only one fulcrum point which causes the panels 20 to rotate concentrically. Water penetration of this seam 50 and the down-acting hinge 30 is prevented by the use of the specially designed surface material 22 which engages both edges of the contiguous panels 20 and covers the hinge into recess 42, and over the barrel 47, providing a continuous water barrier along the length of the seam 50.

With reference back, FIG. 1 demonstrates how the up-acting hinges 10 and down-acting hinges 30 work in concert to provide an accordion style folding and retracting action for the cover 100. Employed for use on a truck bed cover, the hinges 10 and 30 must be structurally sound, as they will be subject to repeated and rough usage, constant road vibration and the extremes of weather, both hot and cold. They must also provide a watertight barrier between the contiguous panels of the truck bed cover. There are no examples of prior art relating to hard folding tonneau covers where a surface treatment such as vinyl was applied to the top surface of the folding cover panels. As part of the cover 100 design criteria, it was reasoned that the application of a uniform surface treatment such as material 22 would yield the two-fold benefit of providing a water barrier over the seams of contiguous panels 20, and a much improved (frameless) appearance. In fact, in all examples of prior art the painted finish of the various products is textured to resemble the leather grain appearance of the materials used for traditional soft tonneau covers. While the application of a surface treatment such as material 22 offered inherent benefits, designing hinges to accommodate its inclusion represented distinct challenges. One such challenge is the fact that material adhered to the surfaces of contiguous panels restricts the rotational movement of the panels particularly when the rotational movement is concentric, and it quickly becomes obvious why this technique was not previously employed. However, the design of the hinges 10 and 30 in the present invention solves this problem and provides for an elegant and functional finished product.

Side-Track and Panel Design

Figure 6:
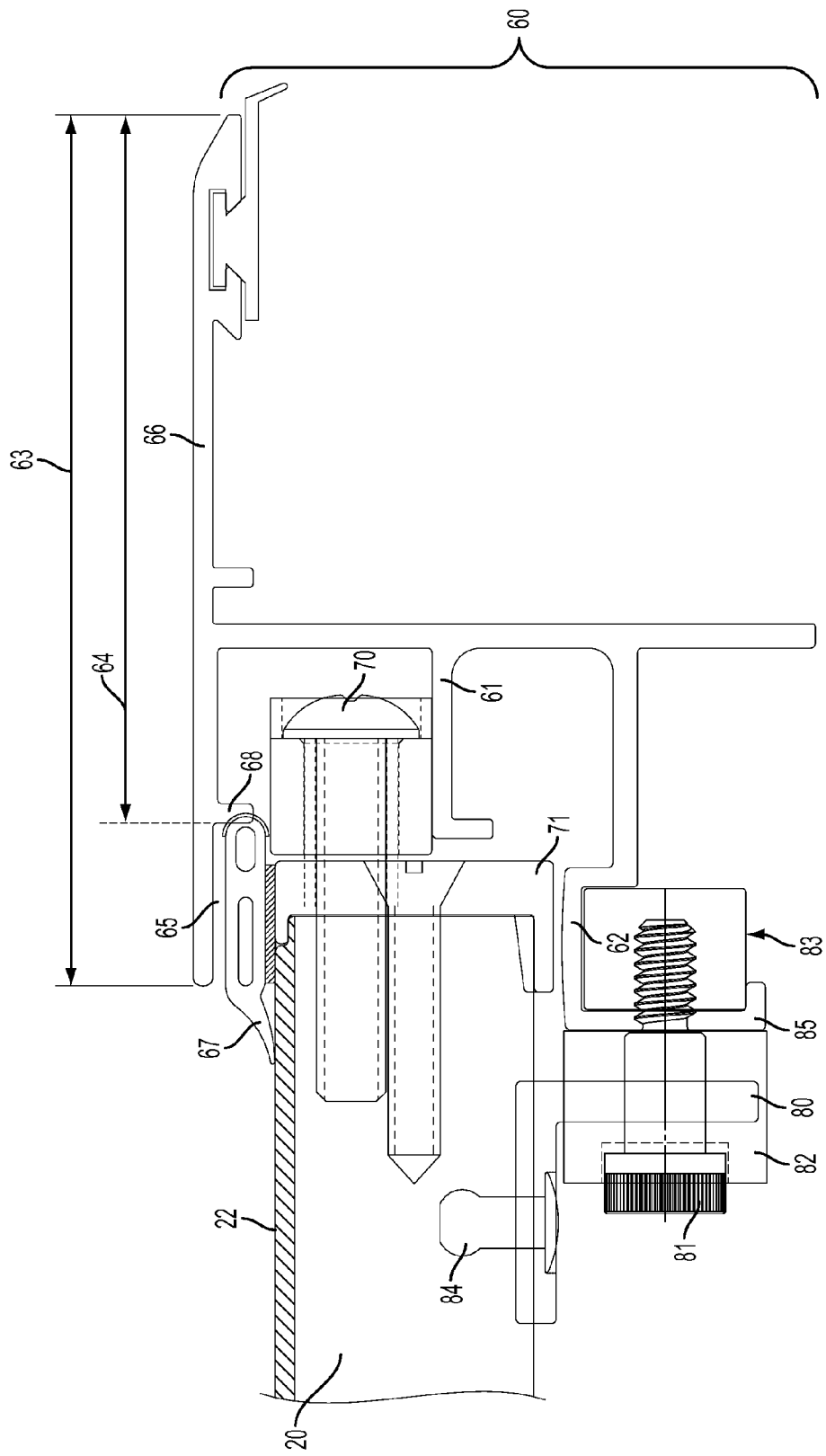
FIG. 6 is a schematic end elevational view of one embodiment of the track and panel design used in the present invention.

With reference to FIG. 6, the cover 100 side-tracks 60 are the main side support members for the cover panels 20 and are the means by which the panels 20 are movably connected to the sides of a truck bed. The side-track 60 is generally attached to the bedrails of the truck bed by a clamping means (see U.S. Pat. No. 5,251,950). Attached to either side of each panel 20 is a panel roller-bearing 70 which extends laterally from the panel 20. In some embodiments, a panel cap 71 is attached to the side of the panel 20 and is disposed between the panel 20 and the track 60 to provide a finished look as well as a solid surface through which to attach the panel roller-bearing 70. The track 60 includes a bearing flange 61 for the panel roller-bearing 70 to travel upon as the panels 20 are moved forward or aft along the length of the track 60. Track 60 also includes, toward the bottom thereof, a support flange 62 for the bottom outermost ends of the panels 20 to bear upon when subjected to a surface load such as snow or any other surface weight. As shown, in some embodiments, the panel cap 71 rests on the support flange 62 to provide vertical support for the panels 20.

In some embodiments, the side track 60 is comprised of two pieces, a back section piece 63 and a front section piece 64. Both the back section 63 and the front section 64 pieces have the same cross-section detail and configuration, with one exception. The top track runner slot 65 of the back section piece 63 is omitted from the front section piece 64. Where the top track runner slot 65 is present, the gasket 67 attached to panel 20 rides therein. The gasket 67 provides a means to prevent water from entering the track 60, to reduce vibration during folding and retraction of the cover, and to prevent buffeting when the vehicle is in motion. When the back and front section pieces 63 and 64 are spliced together to create a single track 60, a notch 68 is created in the top flange 66 of the track 60 by the omission of the top track runner slot 65 from the front section piece 64. This top flange notch permits only the forward-most pair of panels 20 to escape the tracks and be folded upward while the panel roller bearings 71 remain captured within the tracks and all of the panels aft of the notch remain held in the horizontal position.

Figure 7:
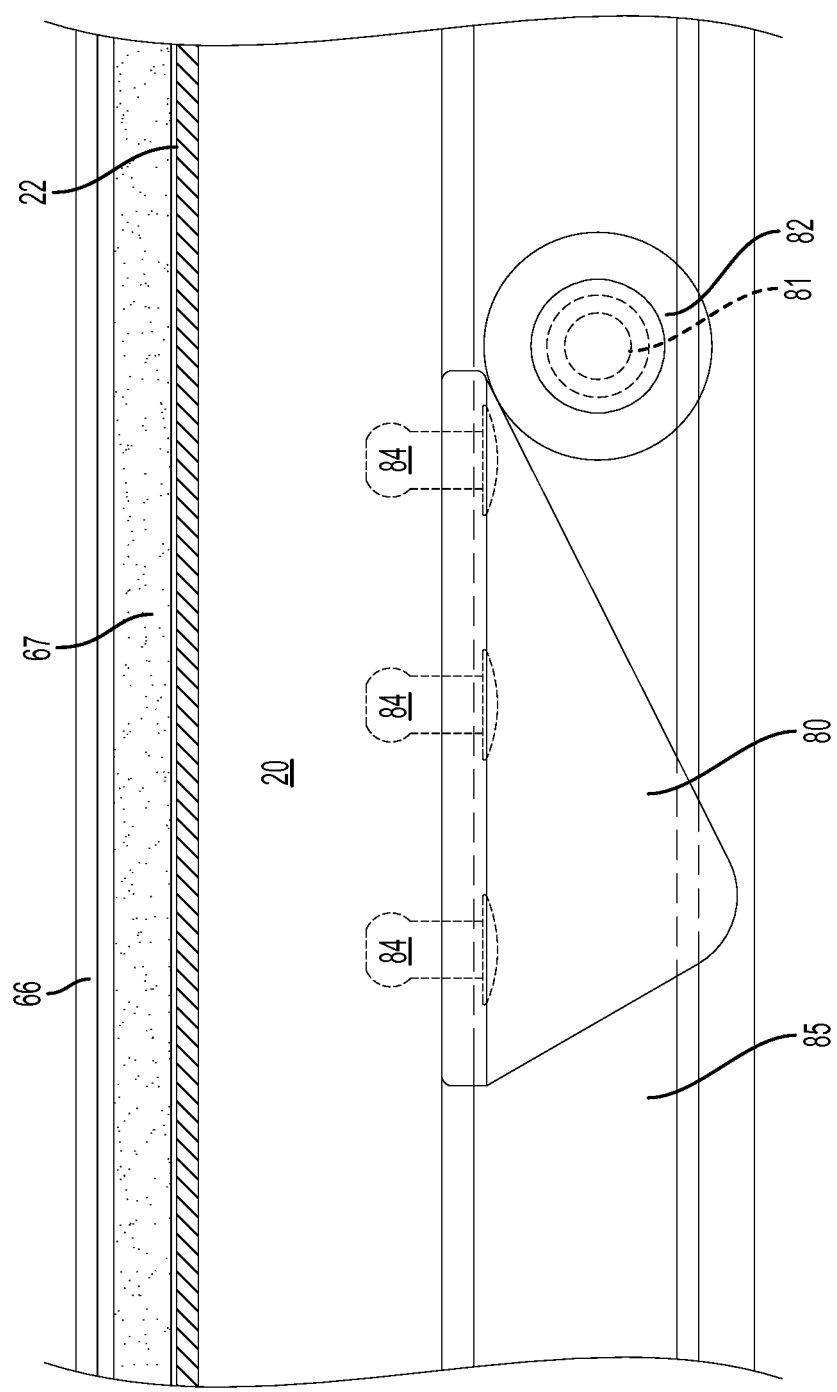
FIG. 7 is a schematic side view of one embodiment of the track and panel design used in the present invention.

With reference to FIGS. 1 & 6-7, to initiate the folding action of each pair of adjacent panels 20, small wedge shaped pieces or ramps 80 are attached to the underside of each side of each of the panels 20, and a corresponding ramp pin 81 with a rotating sleeve 82 has been secured to the inward-most edge 83 of each side track (see FIGS. 5 and 6). In some embodiments, the ramp 80 is attached to the underside of the panels 20 by one or more rivets 84. The ramp 80 is in contact with the pin 81. The pins 81 are positioned so as to be in the path of the ramps 80 so that when the panels 20 are released from the tailgate and pushed forward toward the cab of the truck, the leading edge 86 of the ramps 80 engage the pins 81 and, as the panels 20 advance, the incline of the ramps 80 ride over the rotating sleeves 82 of the pins progressively forcing the panels 20 upward thereby initiating rotation of both the up-acting and down-acting hinges 10 and 30 and ultimately causing the panels 20 to completely fold together as they continue to be moved forward as shown in FIG. 5.

Figure 8:
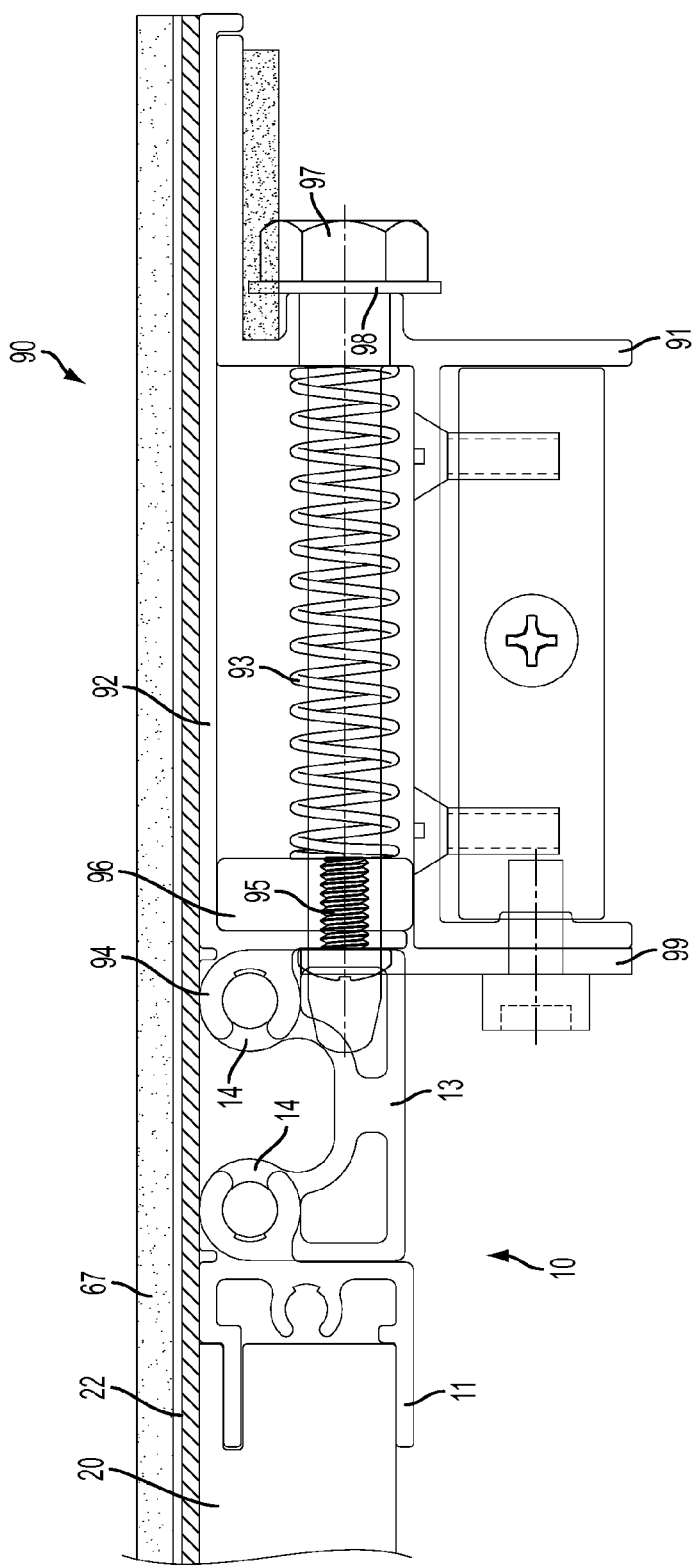
FIG. 8 is a schematic side elevational view of one embodiment of the compressible bulkhead flange used in the present invention.
Figure 9A:
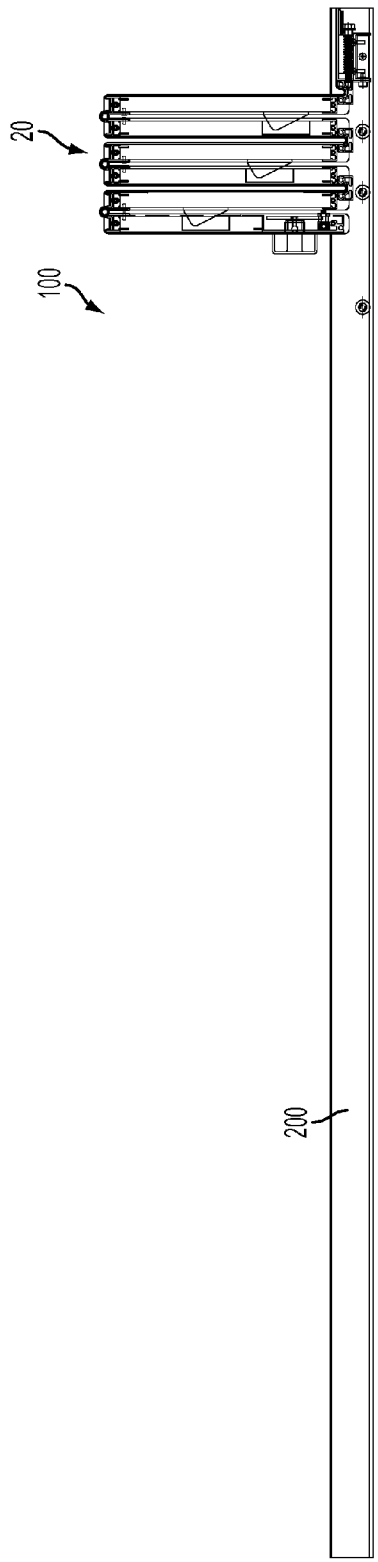
Figure 9B:
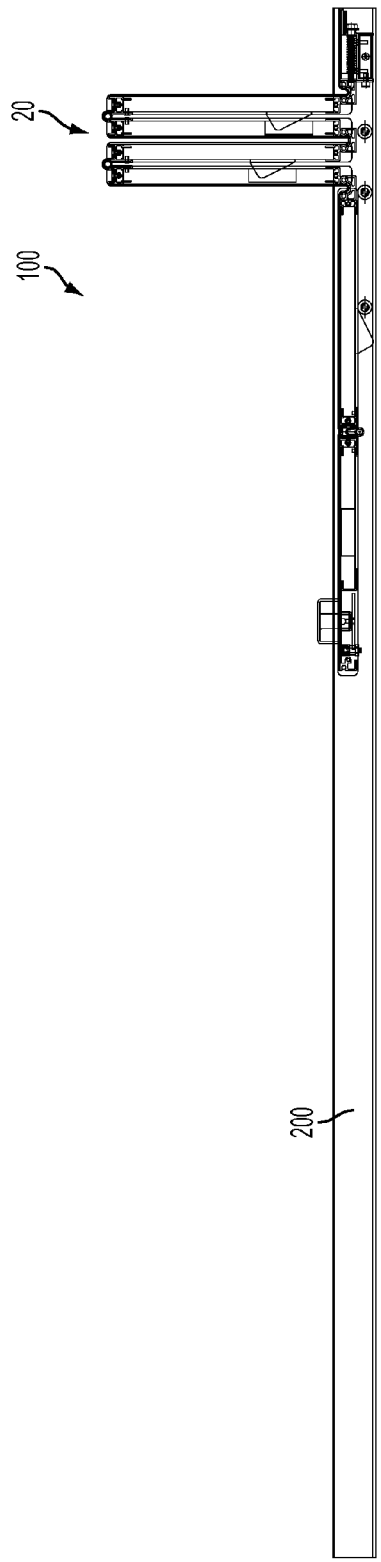

With reference to FIG. 8, shown is a spring loaded compressible bulkhead flange assembly 90 for without some compressible component, the panels 20, which are abutting and connected one to the other in a straight line from tailgate to bulkhead, would not allow the forward movement necessary to advance the ramps over the pins and, consequently, the panels could not be folded. As shown in FIG. 8, the compressible bulkhead flange assembly 90 comprises a flange 91, a bulkhead adapter 92, and a compression spring 93. The flange 91 is located adjacent to the cab area of the truck in which the present invention is installed. The spring 93 abuts and is connected to the up-acting hinge 10 and provides a means to compress thereby allowing the entire cover system to advance a distance necessary to initiate the folding action. Accordingly, the bulkhead adapter 92 includes a bulkhead barrel hinge 94 that pivotably attaches to one of the barrels 14 of the double barrel panel joiner 13 of up-acting hinge 10. As shown, the compression spring 93 is attached between the bulkhead adapter 92 and the bulkhead flange 91, allowing for linear movement or "give" between the two parts. In some embodiments, a screw 95 secures pin bearing 96 to bulkhead adapter 92. Pin bearing 96 is provided to reduce friction between the bulkhead adapter 92 and the bulkhead flange 91. The forward section of the bulkhead flange 91 receives the other end of spring 93 and secures same by a spring pin 97 fitted with a washer 98. The rear bottom section of the bulkhead flange 91 includes a keeper assembly 99 which traps the bulkhead adapter 92 in place atop of bulkhead flange 91, and thereby secures the terminal end of cover 100 into place. This keeper assembly 99 is inaccessible when cover 100 is closed and locked, thereby preventing removal of cover 100 without a key.

In use, when the leading edge of the cover 100 is released from the tailgate and pushed forward, it is the recoil action of the compressible bulkhead flange 91 that allows the forward movement necessary to initiate the folding process of the entire cover 100. Once the panels 20 begin to fold, the pressure on the bulkhead flange 91 releases and the bulkhead flange resets to its original position, i.e. recoils, allowing the process to be repeated as the ramps on the next pair of panels 20 advance into place against the pins. It is appreciated the compressible bulkhead flange 91 is located at the opposite end of the tonneau cover from the tailgate and abuts or adjoins the edge of the truck bed proximal to the cab.

Cover Control and Positioning Feature

Unlike most existing hard folding tonneau covers, the cover 100 of the present invention does not require the tailgate to be lowered in order to release and operate the system, and the panels 20 do not have to be lifted and folded one upon the other in order to access the truck bed. In some embodiments, the rearward-most panel 20 of the cover 100 includes a pair of lockable control levers, one positioned on the driver's side and the other positioned on the passenger's side. By grasping, turning, and holding either one of these control levers, the cover 100 is released from the tailgate and the operator simply pushes the interconnected panels 20 toward the cab of the truck, whereupon the forward-most pair of panels 20 (pair closest to the cab) automatically fold into a vertically standing (stored) position. As the operator continues to grasp the lever and move toward the cab, the next pair of panels 20 automatically folds into a vertically stored position immediately adjacent to the first pair. As each pair of panels 20 fold into the vertically stored position, the operator has the option of releasing the control lever which he or she is grasping, which would cause a spring-loaded linkage with latch mechanism to engage the side-tracks 60 and hold the panels 20 in this vertically stored position without the need to secure or latch the panels by any other secondary means. Thus, the hard folding tonneau cover 100 of the present invention retracts in an accordion-like fashion, rather than the foldover fashion of existing designs. The ability to lock in place at predetermined locations along the side-tracks provides a substantial advantage of the prior art as well.

FIGS. 9A-9D demonstrate the folding and retracting action of the cover 100 in various stages. Shown is a six-panel cover 100 attached to an exemplary truck bed 200 terminating at one end with bulkhead flange assembly 90. Here, the cover 100 utilizes three up-acting hinges 10 and three down acting hinges 30. As shown, the up-acting hinges remain orientated to the centreline of the roller bearings within the side tracks, while the down-acting hinges move upward with their respective panels 20. Accordingly, in a stored position, the panels 20 are vertically oriented. As shown, the back of the cover 100 may include a lever assembly 120 that allows the user to selectively retract, fold, and position the cover 100 on demand. In some embodiments, with the cover 100 in a flat, closed position, when the user disengages the lever assembly 120 the spring 93 action of the bulkhead flange assembly 90 will allow the cover 100 to begin moving forward. The spring 93 allows the initial forward movement of the assembly initiating the upward, folding action of the forward most pair of panels when a pushing force is applied to the rearward most panel. As the user continues to push the cover forward, the panels nearest the front of the cover will fold therefore retracting the entire cover 100. In some embodiments, the user can release the lever assembly 120 any time a pair of panels is completely folded to cease movement of the cover 100 and temporarily lock the cover 100 in place. The operator may therefore choose to open the cover system a distance equal to one pair of panels and release the control lever thereby securing the cover in this partially opened position with one pair of panels secured in the vertically stored position, or alternatively may choose to open and secure the cover a distance equal to two pairs of panels, or may choose to open the cover entirely, causing all of the panels to be secured in the vertically stored position and exposing the entire truck bed for loading purposes. The user can then re-release the lever assembly 120 and continue the folding and retracting action of the cover 100. The user can, in some embodiments, pull backward against the cover 100 to un-retract it and return it to its flat position.

As simply and easily as the cover 100 can be opened to access the truck bed for loading purposes, it can be just as simply and easily closed to secure the contents of the truck bed. By grasping and turning either the driver's side or passenger's side control lever 120, the operator can pull the panel assembly toward the tailgate; whereupon the vertically stored panels 20 sequentially unfold. Here again, the operator has the option of releasing the lever each time a pair of panels 20 unfolds to automatically secure the cover in a partially closed position with no further requirement to latch or secure the panels 20 in place.

Expanded Features and Benefits

Simplified use is in and of itself a significant benefit of the present invention, but along with being easier to use than other hard folding tonneau covers, 100 its speed of operation offers a marked advantage over alternative covers, requiring less than half the time and effort to open or close. It also includes a laminated textured vinyl surface material 22 providing the look and feel of a traditional tonneau cover by covering the panels 20 for a unified look. Further, the cover 100 provides the user with the ability to drive with the cover in a partially open position without having to lash down or secure loose panels. Also, due to the design of the cover 100 with alternating up-acting and down-acting hinges 10 and 30, a smaller panel height dimension can be used which does not prohibit use of the rear view mirror or obstruct the third brake light when the panels 20 are in the vertically stored position. Yet another benefit of the cover 100 is that the tracks 60 are equipped with special mounting flanges for the attachment of a Cargo Manager divider, an optional, under-the-cover, cargo management device that secures cargo in place to prevent cargo from tossing about the bed while the truck is in motion (see Applicant's U.S. Pat. Nos. 6,971,828 B2 and 6,629,807 B2 which are incorporated herein by reference).

Movement

The most obvious difference between the present cover 100 and existing hard folding tonneau covers is in the movement of the panels. The cover's 100 movement is a combination of both "folding" and "retracting." Whereas existing hard folding tonneau cover products must be lifted and folded manually panel upon panel to gain access to the truck bed, the movement of the cover 100 is like that of an accordion requiring no lifting action. When the rearward-most panel 20 of the cover 100 is released from the tailgate via the control lever 120 and pushed forward, the forward-most panels 20 (panels closest to the truck cab) begin to fold into a vertically stored. Because the panels 20 glide on cylindrical roller bearings 70 within side-tracks 60, there is very little resistance and the action of pushing or folding the panels 20 requires only minimal effort by the user.

Appearance

All existing hard folding tonneau covers are constructed with a series of framed composite panels, and accordingly, all hard folding tonneau covers are somewhat similar in appearance. By contrast, the cover 100 herein is finished with textured, laminated vinyl surface material 22 that provides the frameless appearance of a more traditional tonneau cover, in some embodiments revealing only a subtle seam 50 where the down-acting hinge 30 is used. The visibility of the seam 50 is minimized due to the rolled edge-flange 48 of the panel frame 40.

Advantages

The cover 100 offers marked advantages over all existing hard folding tonneau covers. The cover is retractable and can be opened or closed without lifting and folding panels. The cover is self-storing and can be positioned at intervals along the length of the truck bed without requiring a secondary means of securing opened panels. The cover has the sleek, low profile, frameless appearance of a more traditional tonneau cover. This list of product features and benefits were achieved as a result of two key elements of the cover 100 design, namely, the up-acting hinge and the down-acting hinge. While all of the existing hard folding tonneau covers (prior art) employ hinges of various designs to facilitate folding movement, the cover 100 up-acting and down-acting hinges embody specific and unique characteristics that set them apart from all others, culminating in a product that is unique to its industry.

The instant invention has been shown and described herein in what is considered to be the most practical and preferred embodiment. It is recognized, however, that departures may be made therefrom within the scope of the invention and that obvious modifications will occur to a person skilled in the art.

The invention claimed is:

1. A foldable tonneau cover for a truck bed, comprising:
   a plurality of folding flat rigid rectangular panels,
   a plurality of up acting hinges;
   plurality of down acting hinges;
   a flexible sheet of water resistant material for protecting a truck bed;
   first and second truck bed cover tracks attachable to opposing side rails of a truck bed;
   said rigid panels being disposed in a parallel array, pivotally connected to one another by alternately attached up acting hinges and down acting hinges;
   said up acting hinges and said down acting hinges having a top portion and a bottom portion;
   said flexible sheet of material attached on the topside of said flat panels and the top portions of said up acting hinges and said down acting hinges forming a continuous protective surface from one end of said truck bed cover to the opposite end of said truck bed cover;
   said flexible sheet of material connected to said upper side of said flat panels and to each of said alternating up acting hinges and down acting hinges so that there is no excess material when said truck bed cover is in a closed flat position or when said truck bed cover is in an open position where the panels are folded side-by-side;

each of said rigid flat panels having a pair of end faces that are parallel;

a plurality of rollers extendably connected to each end face of said flat rigid panels and sized to engage said first and second tracks mounted on each side of said truck bed allowing the entire truck bed cover to be disposed in a first position covering the entire truck bed in a flat plane but allowing the panels to be moved to a side-by-side folded up position at the front end of the truck bed;

a track panel guide for guiding said rigid panels into a folded up and folded down position mounted on said first and second tracks near the front end of the truck bed cover to ensure that the panels fold up only at the front end of the truck bed cover when the truck bed cover is being opened from a closed position at the rear of said truck bed;

wherein said plurality of panels are configured to sequentially fold and retract lengthwise.

2. The cover of claim 1, wherein said cover is configured to operate between a closed flat position and a partially open position in a variety of retracted positions.

3. The cover of claim 2, wherein in said retracted position, at least one of said folding panels is in a substantially vertical position.

4. The cover of claim 1, wherein in said retracted position, said panels are configured not to block a rear window or a brake light of said vehicle.

5. The cover of claim 2, wherein a top surface of said panels is covered uniformly with a surface material such that said up-acting hinges and said down-acting hinges are not visible when said cover is in said flat position.

6. The cover of claim 1, wherein said cover is adapted to travel along a pair of side tracks and is selectively lockable with respect to said side tracks at incremental locations thereof.

7. The cover of claim 5, wherein said cover is selectively lockable with respect to said at least one side track in a plurality of retracted positions.

8. The cover of claim 7, wherein in said retracted position at least one of said panels is in a substantially vertical position.

9. The cover of claim 1, wherein a front end of said cover is attached to a spring-loaded compressible bulkhead flange.

10. A truck bed cover for a truck having a truck bed and a truck cab comprising:

a plurality of rigid parallel panels, said adjacent panels being foldable in an accordion fashion;

a sheet of flexible waterproof material attached to and covering said rigid parallel panels;

said truck bed cover having a closed position protecting the truck bed from outside elements and an open position in which the panels are folded together in an accordion fashion at the front of the truck bed immediately behind the cab;

a plurality of up-acting hinges having adjacent panel connections;

a plurality of down-acting hinges having adjacent panel connections;

said plurality of rigid parallel panels being connected together by alternating up-acting hinges and down-acting hinges and corresponding panel connections;

said sheet of flexible waterproof material attached as a continuous sheet to said rigid parallel panels on the top sides of said panels and attached to the top side of said panel connecting up-acting hinges and the top side of said panel connecting down-acting hinges to protect the truck bed from exterior elements such as moisture when the truck bed cover is closed;

said up-acting hinges and adjacent panel connections include a sheet material storage space that receives excess flexible material when the panels are disposed in a closed position in a flat plane;

said down-acting hinges and adjacent panel connections include a sheet material storage space that receives excess flexible material when the adjacent panel connections are disposed in a folded parallel disposition; and said up-acting hinges and said down-acting hinges and adjacent panel storage spaces preventing extra folds of the flexible waterproof material whether the truck bed cover is closed in a flat plane or open in a folded accordion fashion.

11. The truck bed cover as in claim 10, including:

first and second side rails connected to opposing sides of said truck bed, said first and second side rails including roller receiving channels and a longitudinal slot opening;

plurality of rollers connected to each side of said rigid panels and mounted inside said first and second rails so that the rigid truck bed cover panels can freely slide forwards and backwards inside said first and second rails allowing the truck bed cover to be disposed in the closed position in which the rigid panels are flat and in a single plane and in an open position when the rigid panels are folded together side-by-side in an accordion fashion at the front of the truck bed adjacent the truck cab; and a panel lifter cam mounted adjacent the first and second side rails near the front of the truck bed to initiate the folding action of the rigid panels as they are moved forward towards the front end of the truck bed while the rearmost panels remain in a flat plane.

* * * * *